US012580859B2

(12) United States Patent
Levy et al.

(10) Patent No.: US 12,580,859 B2
(45) Date of Patent: Mar. 17, 2026

(54) OPTIMIZING HASH TABLE SELECTION

(71) Applicant: MELLANOX TECHNOLOGIES, LTD., Yokneam (IL)

(72) Inventors: Gil Levy, Hod-Hasharon (IL); Pedro Reviriego, Madrid (ES); Gonzalo Martínez, Madrid (ES); José Alberto Hernández-Gutiérrez, Fuenlabrada (ES)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 324 days.

(21) Appl. No.: 17/979,200

(22) Filed: Nov. 2, 2022

(65) Prior Publication Data

US 2024/0146652 A1 May 2, 2024

(51) Int. Cl.
*H04L 45/7453* (2022.01)

(52) U.S. Cl.
CPC ................................ *H04L 45/7453* (2013.01)

(58) Field of Classification Search
CPC .... H04L 45/7453; H04L 29/06; G06F 16/901
USPC .......................................................... 370/392
See application file for complete search history.

(56) References Cited

U.S. PATENT DOCUMENTS

| | | | |
|---|---|---|---|
| 9,984,144 B2 | 5/2018 | Levy et al. | |
| 2019/0207853 A1* | 7/2019 | Ferriter | G06F 16/137 |
| 2020/0151255 A1* | 5/2020 | Zong | G06N 20/00 |

OTHER PUBLICATIONS

Daly et al. "TupleMerge: Fast Software Packet Processing for Online Packet Classification," IEEE/ACM Transactions on Networking, Aug. 2019, vol. 27, No. 4, pp. 1417-1431.

(Continued)

*Primary Examiner* — Hermon Asres
(74) *Attorney, Agent, or Firm* — Sheridan Ross P.C.

(57) ABSTRACT

Network devices, systems, and methods are provided. In one example, a network device includes one or more packet classification circuits and one or more hash selection circuits that cooperate with the one or more packet classification circuits to provide the one or more packet classification circuits with a hash table selection order. The hash table selection order may be determined for a packet to be classified with the support of machine learning by the one or more packet classification circuits based on information contained in the packet.

20 Claims, 6 Drawing Sheets

(56)         References Cited

OTHER PUBLICATIONS

Dharmapurikar et al. "Longest Prefix Matching Using Bloom Filters," IEEE/ACM Transactions on Networking, Apr. 2006, vol. 14, No. 2, pp. 397-409.

Kirsch et al. "Hash-Based Techniques for High-Speed Packet Processing," Algorithms for Next Generation Networks, 2010, 40 pages.

Levy et al. "Flexible Packet Matching with Single Double Cuckhoo Hash," IEEE Communications Magazine, Jun. 2017, vol. 55, No. 6, pp. 212-217.

Lim et al. "Tuple Pruning Using Bloom Filters for Packet Classification," IEEE Micro, May-Jun. 2010, vol. 30, No. 3, pp. 48-59.

Srinivasan et al. "Packet Classification using Tuple Space Search," ACM SIGCOMM 1998, 1998, pp. 191-202.

Taylor et al. ClassBench: A Packet Classification Benchmark, INFOCOM, Mar. 2005, pp. 2068-2079.

Waldvogel et la. "Scalable High Speed IP Routing Lookups," ACM SIGCOMM Computer Communication Review, Oct. 1997, vol. 27, No. 4, pp. 25-36.

Xu et al. "High-Throughput and Memory-Efficient Multimatch Packet Classification Based on Distributed and Pipelined Hash Tables," IEEE/ACM Transactions on Networking, Jun. 2014, vol. 22, No. 3, pp. 982-995.

* cited by examiner

400

404
Receive Packet

408
Determine Hash Table Selection Order

412
Select, Based On Hash Table Selection Order, A Hash Table For Use In Classifying The Packet 416
Use Selected Hash Table To Classify Packet 420
Determine Routing For Packet 424
Transmit Packet According To Routing

500

Receive Packet — 504

Provide Packet Information To Machine Learning Model — 508

Receive, From Machine Learning Model, Hash Table Selection Order — 512

Search Hash Tables According To Hash Table Selection Order — 516

Find Hash Table Match For Packet — 520

Use Matching Hash Table To Classify The Packet — 524

Determine Routing For Packet — 528

Transmit Packet According To Routing — 532

600

Determine A First Subset Of A
Hash Selection Order ⌐ 604

Determine A Second Subset Of A
Hash Selection Order ⌐ 608

Search First Subset Prior To
Searching Second Subset ⌐ 612

OPTIMIZING HASH TABLE SELECTION

FIELD OF THE DISCLOSURE

The present disclosure is generally directed toward networking devices and, in particular, toward efficient packet processing within a networking device.

BACKGROUND

Networking devices such as routers, switches, Network Interface Controllers (NICs), etc. normally include a packet processing subsystem that manages the traversal of packets across a multi-layered network or protocol stack. In some networks, packet processing functions are injected into the network. Network behavior and quality can be vastly improved if each packet is processed as efficiently as possible.

BRIEF SUMMARY

Embodiments of the present disclosure aim to improve network performance by enhancing packet classification and routing processes. In some embodiments, the improved packet classification and routing processes may be performed by or within a network/networking device. Examples of network/networking devices that may be configured perform the operations depicted and described herein may include, without limitation, a switch, a NIC, a network adapter, an Ethernet card, an expansion card, a Local Area Network (LAN) adapter, a wireless router, a physical network interface, a network border device (e.g., Session Border Controller (SBC), firewall, etc.) or similar type of device configured to perform network or data transfer processes.

Illustratively, and without limitation, a networking device is disclosed herein to include: one or more packet classification circuits; and one or more hash selection circuits that cooperate with the one or more packet classification circuits to provide the one or more packet classification circuits with a hash table selection order that is determined for a packet to be classified by the one or more packet classification circuits based on information contained in the packet.

In some embodiments, the one or more hash selection circuits enable the hash table selection order to be dynamically determined for the packet and the one or more packet classification circuits enable packet forwarding from a first network location to a second network location.

In some embodiments, the hash table selection order provides the one or more packet classification circuits with an order in which a plurality of hash tables are searched and matched against the packet.

In some embodiments, the plurality of hash tables include a first hash table and a second hash table, and the first hash table is positioned higher in the hash table selection order than the second hash table when the first hash table includes more matching classifier parameters for the packet as compared to the second hash table.

In some embodiments, the one or more packet classification circuits and the one or more hash select circuits are provided in a common processing unit.

In some embodiments, the one or more packet classification circuits are provided in a first processing unit and the one or more hash selection circuits are provided in a second processing unit.

In some embodiments, the hash table selection order is provided by a machine learning model.

In some embodiments, the machine learning model processes the information contained in the packet to determine the hash table selection order.

In some embodiments, the machine learning model is provided as part of the one or more hash selection circuits.

In some embodiments, the machine learning model is provided separate from the one or more hash selection circuits.

In some embodiments, the networking device further includes an approximate membership check filter that is to determine a first subset of the hash table selection order and wherein the machine learning model is to determine a second subset of the hash table selection order.

In some embodiments, the machine learning model comprises at least one of a random forest, a logistic regression, and a decision tree.

In another example a system is disclosed that includes: one or more processors; and computer memory coupled with the one or more processors, where the computer memory comprises data stored thereon that, when executed by the one or more processors, enables the one or more processors to: receive a packet; determine a hash table selection order for the packet based on information contained in the packet; select, based on the hash table selection order, a hash table from among a plurality of hash tables for use in classification the packet; and classify the packet using the selected hash table.

In some embodiments, the one or more processors include a first processor and a second processor.

In some embodiments, the hash table selection order is determined based on an output from a machine learning model that is trained to correlate hash tables with packets based on network flow data.

In some embodiments, the machine learning model includes at least one of a random forest, a logistic regression, and a decision tree.

In some embodiments, the system further includes a filter that is applied to determine a first subset of the hash selection order and the machine learning model determines a second subset of the hash table selection order.

In some embodiments, the one or more processors and the computer memory are provided in a common processing unit.

In another example a network device is disclosed that includes: a processor; and computer memory coupled with the processor, where the computer memory includes data stored thereon that, when executed by the processor, enables the processor to: receive a packet; provide information from the packet to a machine learning model; receive, from the machine learning model, a hash table selection order that is determined based on the information from the packet; search, according to the hash table selection order, one or more hash tables for a match with the packet; determine, based on searching, that a hash table from the one or more hash tables matches the packet; and utilize the hash table to classify the packet within a network.

In some embodiments, the network device further includes an approximate membership check filter that is applicable to determine a first subset of the hash selection order, where the machine learning model determines a second subset of the hash table selection order, and where the machine learning model includes at least one of a random forest, a logistic regression, and a decision tree.

Additional features and advantages are described herein and will be apparent from the following Description and the figures.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

Figure 1:
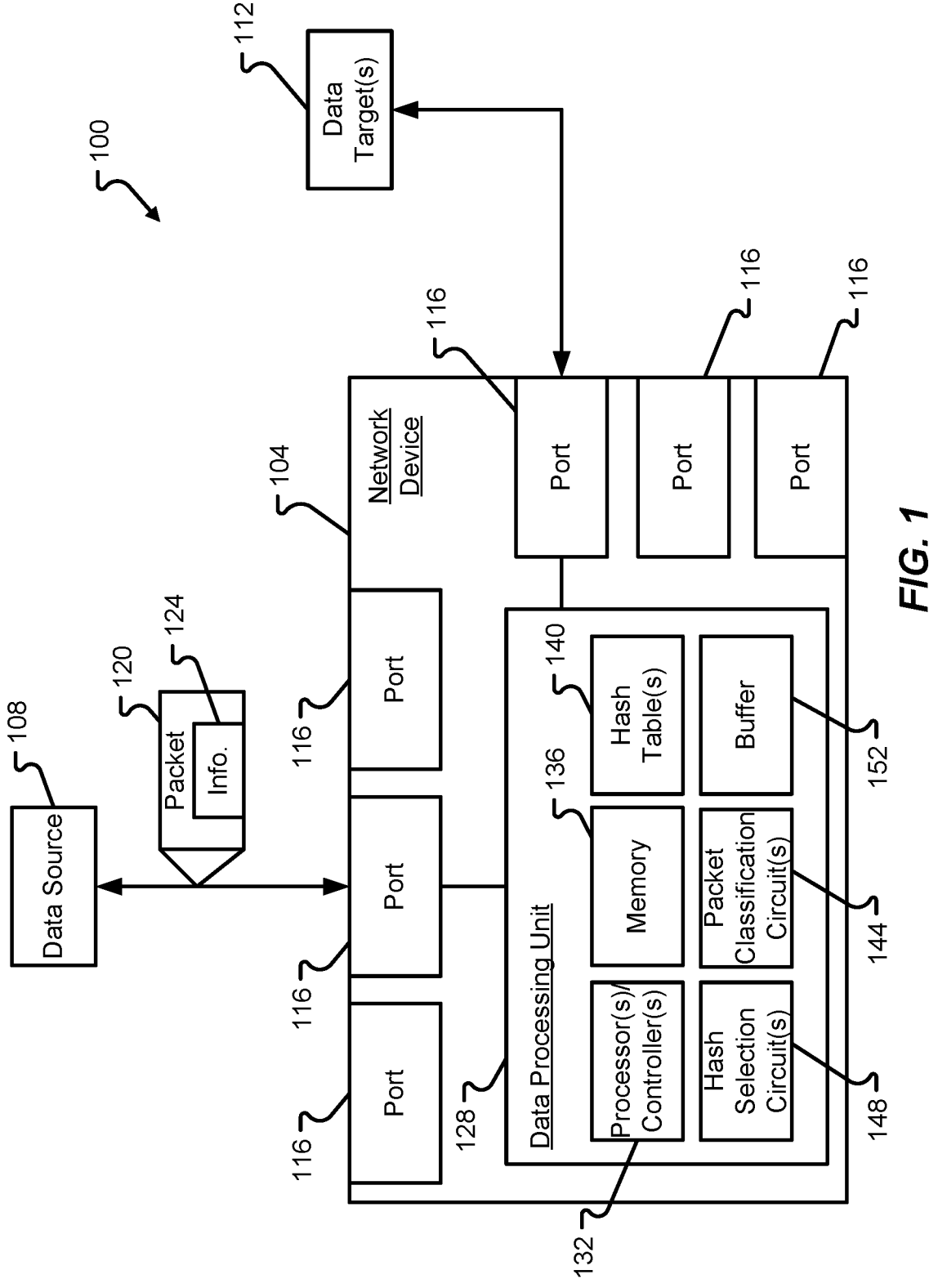
FIG. 1 is a block diagram illustrating a computing system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a Printed Circuit Board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means: A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed.

Human input that consents to the performance of the process or operation is not deemed to be "material."

The terms "determine," "calculate," and "compute," and variations thereof, as used herein, are used interchangeably and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-6, various systems and methods for packet processing will be described in accordance with at least some embodiments of the present disclosure. As will be described in more detail herein, packet processing may include evaluating, classifying, routing, and/or transmitting a packet. Improvements in the speed with which a packet is processed (e.g., evaluated, classified, routed, and/or transmitted) can improve performance of devices and networks.

Hash tables are widely used for packet classification in switches, routers and NICs. For example, hash tables are used to implement longest prefix match in the Internet Protocol (IP), and access control lists or and security checking. Although the use of hash tables reduces or eliminates the need to use costly Ternary Content Addressable Memories (TCAMs), it introduces other challenges. As one example, a large number of hash tables may need to be accessed to find the one corresponding to a given packet. This can limit performance and several solutions have been proposed.

Depending on the number of tables needed, the cost per packet in terms of memory access can be large. For example, some network devices may need more than a hundred such tables. Thus, a packet that matches the last table would have to be checked against more than a hundred tables before arriving at the correct hash table. This problem has led to schemes that merge tables to reduce the number of hash tables searched. Merging also has its limitations as it can lead to collisions on the merged hash tables.

Another strategy is to start the search with the hash tables that have more matches or merging tables. Yet another option is to have a preprocessing to select the hash tables to search. Filters, such as Bloom filters have been used to preprocess and select hash tables for searching. The filters are checked first and only on a positive match is the corresponding hash table searched. A limitation of this approach is that the memory needed for such filters is still proportional to the number of packet classification rules, which means that as rule sets grow so do the filters. An alternative and improved approach is described herein that attempts to address the use of hash tables in packet processing. In some embodiments, a machine learning algorithm is provided to select the tables to search. A machine learning model may be trained to operate as a packet classifier by identifying the hash table that corresponds to packets and then use the classifier to select the hash table search order.

Referring initially to FIG. 1, an illustrative computing system 100 is shown in which a network device 104 is configured to communicate with a data source 108 and a data target 112. While only a single data target 112 is depicted, it should be appreciated that the network device 104 may route information received from a data source 108 to multiple data targets 112.

The network device 104 may include any type of device used to facilitate machine-to-machine communications. As mentioned above, the network device 104 may include one or more of a switch, a NIC, a network adapter, Host Channel Adapter (HCA), an Ethernet card, an expansion card, LAN adapter, physical network interface, a wireless router, a network border device, or the like. In some embodiments, the network device 104 is provided with a data processing unit 128 that is configured to perform data processing functions within the network device 104. Specifically, the network device 104 may be configured to perform packet classification functions as well as packet transfer functions. More specifically, the network device 104 may be configured to perform packet classification functions as part of improving its ability to transfer packets from a data source 108 to a data target 112.

The network device 104 may be connected with the data source 108 via a port 116. The port 116 may enable communications between the network device 104 and the data source 108 via a first communication link. The first communication link may include a wired connection, a wireless connection, an electrical connection, etc. In some embodiments, the first communication link may facilitate the transmission of data packets 120 between the network device 104 and the data source 108 via one or more of electrical signals, optical signals, combinations thereof, and the like. The data packets 120 may carry information 124, such as data and metadata, from the data source 108 to the network device 104. The metadata of the data packet 120 may be used as part of routing the data packet 120 whereas the data itself is intended to be transferred from the data source 108 to the data target 112. In other words, the network device 104 may enable communications between the data source 108 and the data target(s) 112 and may further utilize the data processing unit 128 to transfer data from the data source 108 to the data target(s) 112. It should be appreciated that the system bus (e.g., the pathway carrying data between the data source 108 and data target(s) 112) may include, without limitation, a PCIe link, a Compute Express Link (CXL) link, a high-speed direct GPU-to-GPU link (e.g., an NVlink), etc.

The network device 104 may be connected with one or more data targets 112 via another port 116. The port 116 may be similar or identical to the port 116 that is connected to the data source 108. In some embodiments, a single port 116 may be configured to receive the data packet 120 from the data source 108 and route the data packet 120 to the data target 112. In other words, a single port 116 may connect the network device 104 to the data source 108 and the data target(s) 112. In some embodiments, however, different physical devices may be used for the different interfaces. As shown in FIG. 1, the network device 104 may include a plurality of ports 116.

Communications between the network device 104 and the data target(s) 112 may be carried over a second communication link that is created by a port 116. Much like the first communication link described in connection with the data source 108, the second communication link facilitating communications with the data target(s) 112 may include a wired connection, a wireless connection, an electrical connection, etc. In some embodiments, the second communication link may facilitate the transmission of data packets between the network device 104 and the data target(s) 112 via one or more of electrical signals, optical signals, combinations thereof, and the like.

In some embodiments, a port 116 may include a single communication port, multiple communication ports, a serial data interface, a PCIe, an Ethernet port, an InfiniBand (IB) port, etc. The communication links established via the ports 116 may be established using a networking cable, an optical fiber, an electrical wire, a trace, a serial data cable, an Ethernet cable, or the like. The communication links may utilize any type of known or yet-to-be-developed communication protocol (e.g., packet-based communication protocol, serial communication protocol, parallel communication protocol, etc.).

Source data access and/or target data access may be achieved over a system bus (e.g., locally), over a network port (e.g., remotely), or neither (e.g., for an on-device memory). While various embodiments will be depicted or described in connection with a particular type of data access, it should be appreciated that the claims are not limited to any particular type of data access.

The data source 108 and/or data target(s) 112 may correspond to or include any type of known computational device or collection of computational devices. A data source 108, for example, may include a host device, an on-network device memory, a peer device memory, etc. A data target 112, for example, may include a host memory device, an on-network device memory, a peer device memory, etc. In some embodiments, that data target(s) 112 may be located in proximity with the network device 104 (e.g., a physical cable may be used to directly connect a data target 112 with the network device 104). In some embodiments, one or more data targets 112 may be located remotely from the network device 104 and the data processing unit 128 of the network device 104. Specifically, the data target(s) 112 may be connected to the network device 104 via a communication network without departing from the scope of the present disclosure.

Examples of a data source 108 and/or data target 112 include, without limitation, a host device, a server, a network appliance, a data storage device, a camera, a neural network, a Deep Neural Network (DNN), or combinations thereof. A data source 108 and/or data target 112, in some embodiments, may correspond to one or more of a Personal Computer (PC), a laptop, a tablet, a smartphone, a cluster, a container, or the like. It should be appreciated that a data source 108 and/or data target 112 may be referred to as a host, which may include a network host, an Ethernet host, an IB host, etc. As another specific but non-limiting example, one or more of the data source 108 and/or data target(s) 112 may correspond to a server offering information resources, services and/or applications to user devices, client devices, or other hosts in the computational system 100. It should be appreciated that the data source 108 and/or data target(s) 112 may be assigned at least one network address (e.g., an Internet Protocol (IP) address) and the format of the network address assigned thereto may depend upon the nature of the network to which the device is connected.

The network device 104 may correspond to an optical device and/or electrical device. The data processing unit 128 of the network device 104 may be configured to receive data packets 120 from the data source 108, classify the data packet 120, and then use the classification of the data packet 120 to enable routing of the data packet 120 to the data target(s) 112. In some embodiments, the data processing unit 128 may include components that sit between different ports 116. In some embodiments, the data processing unit 128 may include components that process data packets 120 received at a port 116 from the data source 108 and then transmit the data packet to a data target 112 via the same port 116.

Components that may be optionally provided as part of the data processing unit 128 include, without limitation, one or more processors 132, memory 136, one or more hash tables 140, one or more packet classification circuits 144, one or more hash selection circuits 148, and a buffer 152. The buffer 152 may include one or multiple buffer memory devices and may correspond to an area or type of memory device that is used to collect data received from the data source 108. The buffer 152 may alternatively or additionally store multiple data packets 120 (or information 124 from multiple data packets 120) received from the data source 108 prior to the network device 104 transmitting the data to the data target(s) 112.

The memory 136 may include instructions for execution by the processor 132 that, when executed by the processor 132, enable the data processing unit 128 to analyze data received from the data source 108 and truncate the data (e.g., truncate packets) in an efficient manner. The instructions stored in memory 136 may also enable the processor 132 to transmit the truncated data to the data target(s) 112.

The one or more hash selection circuits 148 and the one or more packet classification circuits 144 may be provided on common circuitry or may be provided as different circuits, as shown in FIG. 1. In some embodiments, packet classification circuit(s) 144 and/or the hash selection circuit(s) 148 may be provided as part of the processor(s) 132 or may be specifically configured to perform a function of the processor 132 without necessarily referencing instructions in memory 136. For instance, the packet classification circuit(s) 144 and/or hash selection circuit(s) 148 may include digital circuit components, analog circuit components, active circuit components, passive circuit components, or the like that are specifically configured to perform a particular data truncation operation and/or transmission process. The packet classification circuit(s) 144 and/or hash selection circuit(s) 148 may alternatively or additionally include switching hardware that is configurable to selectively interconnect one port 116 with another port 116 (e.g., where the network device 104 includes a switch or a component of a switch). Accordingly, the packet classification circuit(s) 144 and/or hash selection circuit(s) 148 may include electrical and/or optical components without departing from the scope of the present disclosure.

As will be described in further detail herein, the hash selection circuit(s) 148 may be configured to search hash table(s) 140 for a packet. In some embodiments, the hash selection circuit(s) 148 may cooperate with the packet classification circuit(s) 144 by providing the packet classification circuit(s) 144 with a hash table selection order that is determined on a per-packet basis. Each data packet 120 may be classified by the packet classification circuit(s) 144 based on information 124 contained in the data packet 120. In some embodiments, the hash selection circuit(s) 148 enable a hash table selection order to be dynamically determined for the data packet 120. In some embodiments, the packet classification circuit(s) 144 enable packet forwarding from a first network location (e.g., a data source 108) to a second network location (e.g., a data target 112). The hash table selection order generated by the hash selection circuit(s) 148 may provide the packet classification circuit(s) 144 with an order in which a plurality of hash tables 140 are searched and matched against a data packet 120.

In some embodiments, the hash table(s) 140 include a plurality of hash tables. As mentioned above and as will be described in further detail below, the order in which the hash tables are searched during the processing of a packet can improve the speed with which a packet is processed. In some embodiments, the hash table(s) 140 include a first hash table and a second hash table. The hash table selection order determined by the hash selection circuit(s) 148 may position the first hash table higher than the second hash table when the first hash table comprises more matching classifier parameters for the packet as compared to the second hash table. Non-limiting examples of parameters that may be used to classify a packet include source IP addresses, destination IP addresses, L4 ports, protocol, TCP flags, port ranges, ingress ports, packet length, and the like.

The processor(s) 132, packet classification circuit(s) 144, and/or hash selection circuit(s) 148 may include one or more Integrated Circuit (IC) chips, microprocessors, circuit boards, CPUs, Graphics Processing Units (GPUs), Data Processing Units (DPUs), simple analog circuit components (e.g., resistors, capacitors, inductors, etc.), digital circuit components (e.g., transistors, logic gates, etc.), registers, Field Programmable Gate Arrays (FPGAs), Application Specific Integrated Circuits (ASICs), combinations thereof, and the like. It should be appreciated that the processor 132 may correspond to an optional component of the data processing unit 128, especially in instances where the packet classification circuit(s) 144 and/or hash selection circuit(s) 148 provide sufficient functionality to support operations of the data processing unit 128 described herein.

The memory 136 may include any number of types of memory devices. As an example, the memory 136 may include Random Access Memory (RAM), Read Only Memory (ROM), flash memory, Electronically-Erasable Programmable ROM (EEPROM), Dynamic RAM (DRAM), buffer 152 memory, combinations thereof, and the like. In other words, the buffer 152 may be provided as part of memory 136 without departing from the scope of the present disclosure.

Figure 2:
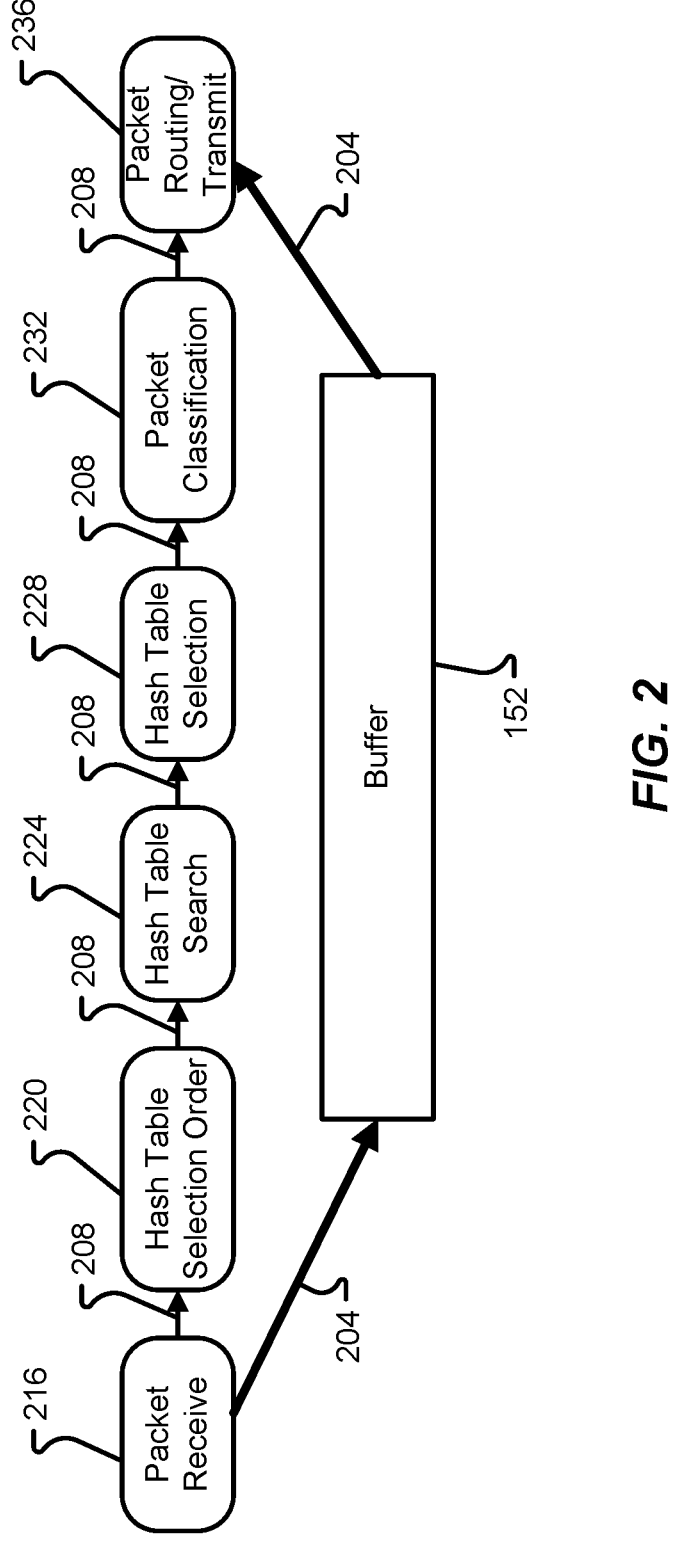
FIG. 2 is a block diagram illustrating details of a packet processing operation in accordance with at least some embodiments of the present disclosure.

With reference now to FIG. 2, additional details of packet processing operations will be described in accordance with at least some embodiments of the present disclosure. FIG. 2 specifically illustrates a data processing pipeline in which a buffer 152 can be used to temporarily store a packet's 120 data after being received at the network device 104 from the data source 108 and before being transmitted to the data target(s) 112. In some embodiments, the packet's descriptor may follow a packet descriptor path 208 and the packet's data may follow a packet data path 204. The packet data path 204 may flow through the buffer 152 whereas the packet descriptor path 208 may bypass the buffer 152. Both the packet data path 204 and packet descriptor path 208 begin at a packet receive operation 216. When the packet is received in the packet receive operation 216 (e.g., at a port 116 of a network device 104 or within the DPU 128 itself), the packet's 120 data may be written into the buffer 152.

The information 124 from the data packet 120 may be analyzed by the hash selection circuit(s) 148 to determine a hash table selection order 220. The hash table selection order 220 may be provided to the packet classification circuit(s) 144 to perform a hash table search 224.

Based on the hash table search 224, the packet classification circuit(s) 144 may select a hash table 228 for use in packet classification. In particular, the packet classification circuit(s) 144 may attempt to match the packet with a hash table 140 and may search the hash tables 140 according to the hash table selection order 220. When a match is found, the packet classification circuit(s) 144 may utilize the selected hash table to classify the packet 232. Classification of the packet may be used to support packet routing and/or transmission 236 to a data target 112. Specifically, once a routing decision is made for a packet, the packet's 120 data may be retrieved from the buffer 152 and transmitted to the data target 112 via the port 116.

Figure 3:
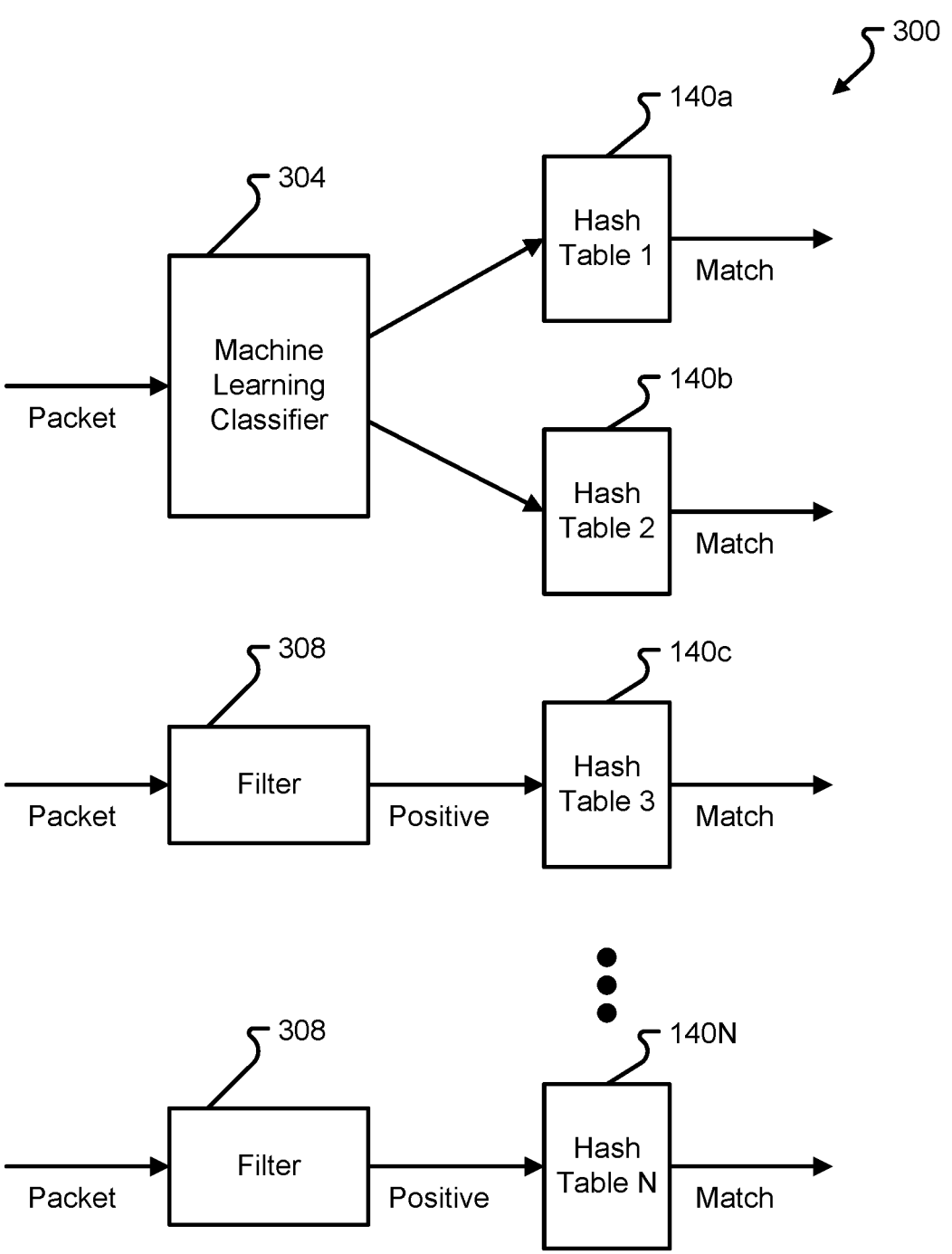
FIG. 3 illustrates a machine learning and filter-based hash table selection architecture useable in accordance with at least some embodiments of the present disclosure.

With reference now to FIG. 3, additional details of an architecture 300 used to perform hash table 140 selection will be described in accordance with at least some embodiments of the present disclosure. The architecture 300 is shown to include a machine learning classifier 304 as well as one or more filters 308. The machine learning classifier 304 and filter(s) 308 may be provided as part of the packet classification circuit(s) 144 and/or hash selection circuit(s) 148. In some embodiments, the machine learning classifier 304 and filter(s) 308 are used in concert to help identify a hash table selection order. The machine learning classifier 304 may be trained to identify the hash table 140 that corresponds to a packet 120 and then use it to select the hash table search order.

The illustrated architecture 300 enables information 124 from a data packet 120 to be provided to the machine learning classifier 304 and one or more filters 308. The information 124 from the data packet 120 may travel to the machine learning classifier 304 before, after, or in parallel with travelling to the one or more filters 308. Compared to the sole use of filters, the machine learning classifier-based approach has the benefit that its complexity does not necessarily scales with the number of rules as is the case for filters (e.g., Bloom filters). This makes it attractive for large scale rule sets that are becoming increasingly common in large cloud datacenters and networks. As shown in FIG. 3, the machine learning classifier 304 may be used to search a plurality of hash tables 140a, 104b, whereas a filter 308 is used to search a particular hash table. In the illustrated example, one filter 308 is provided for the third hash table 140c and another filter 308 is provided for the Nth hash table 140N. The machine learning classifier 304 is shown to support searching of two hash tables, but it should be appreciated that the machine learning classifier 304 can be used to support searching of two, three, four, . . . , ten, or more hash tables 140 without departing from the scope of the present disclosure. Furthermore, the architecture 300 is shown to have N hash tables 140a-N, where N can be any integer number greater than one.

In some embodiments, the machine learning classifier 304 is used to search a first subset of hash table(s) 140 and filters 308 are used to search a second subset of the hash table(s) 140. The first subset of hash table(s) 140 (e.g., the subset searched by the machine learning classifier 304) may have a larger number of hash tables than the second subset of hash table(s) 140. In some embodiments, the hash tables searched by the machine learning classifier 304 may correspond to lesser used hash tables 140 as compared to the hash tables searched/serviced by the filters 308. In other words, if a hash table 140 is a more commonly used hash table, then a dedicated filter 308 may be used for searching that commonly used hash table. The machine learning classifier 304 may be used to search more tables than have filters 308 assigned thereto (e.g., the number of hash tables in the first subset may be larger than the number of tables in the second subset), but the filters 308 may be used for hash tables accounting for more traffic that flows through the network device 104. In some embodiments, the machine learning classifier 304 may be used to search fewer tables than have filters 308 assigned thereto (e.g., the number of hash tables in the first subset may be smaller than the number of tables in the second subset).

In some embodiments, filters 308 may be used for hash tables 140 that have few rules, but that tend to account for an important fraction of the tables (e.g., only 20% of hash tables 140 may contain 80% of the rules managed by the network device 104). On the other hand, the machine learning classifier 304 may be used for those hash tables 140 that have many rules (e.g., more than a predetermined number of rules). Such an approach allows for simplification of the machine learning classifier 304, improving its performance while the filters 308 would have low cost as they store only a few rules.

In some embodiments, the machine learning classifier 304 may include any type of combination of machine learning models. As some non-limiting examples, the machine learning classifier 304 may include a random forest, a logistic regression, or a decision tree. The filters 308 may correspond to Bloom filters and may be assigned on a 1:1 basis to a hash table 140 that is not assigned to the machine learning classifier 304. In some embodiments, a filter 308 (or all of the filters 308) may include an approximate membership check filter that is configured to determine a first subset of the hash table selection order. Meanwhile, the machine learning classifier 304 may be configured to determine a second subset of the hash table selection order. The first subset (e.g., output of the filters 308) and the second subset (e.g., output of the machine learning classifier 304) can be combined. In other words, the outputs of the machine learning classifier 304 and the filters 308 may be combined to create the entire/complete hash table selection order.

Figure 4:
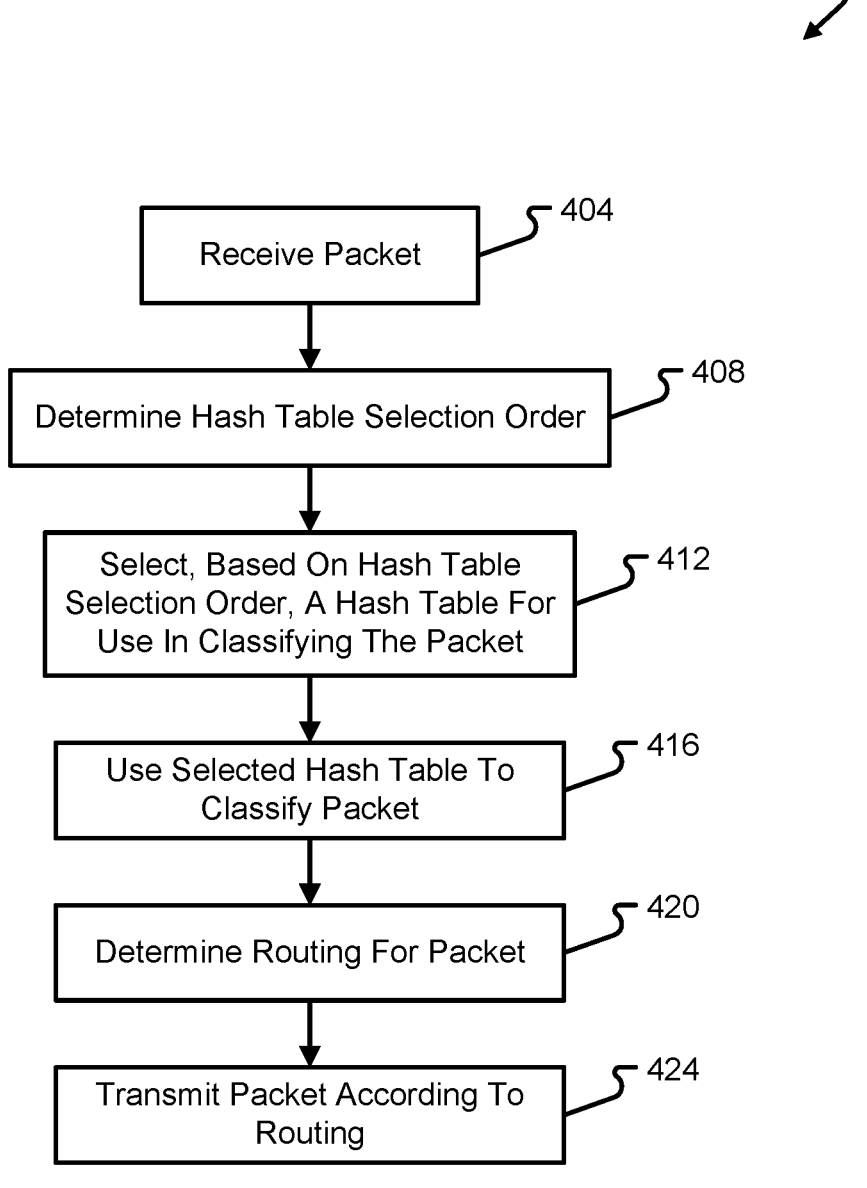
FIG. 4 is a flow diagram illustrating a first packet processing method in accordance with at least some embodiments of the present disclosure.
Figure 5:
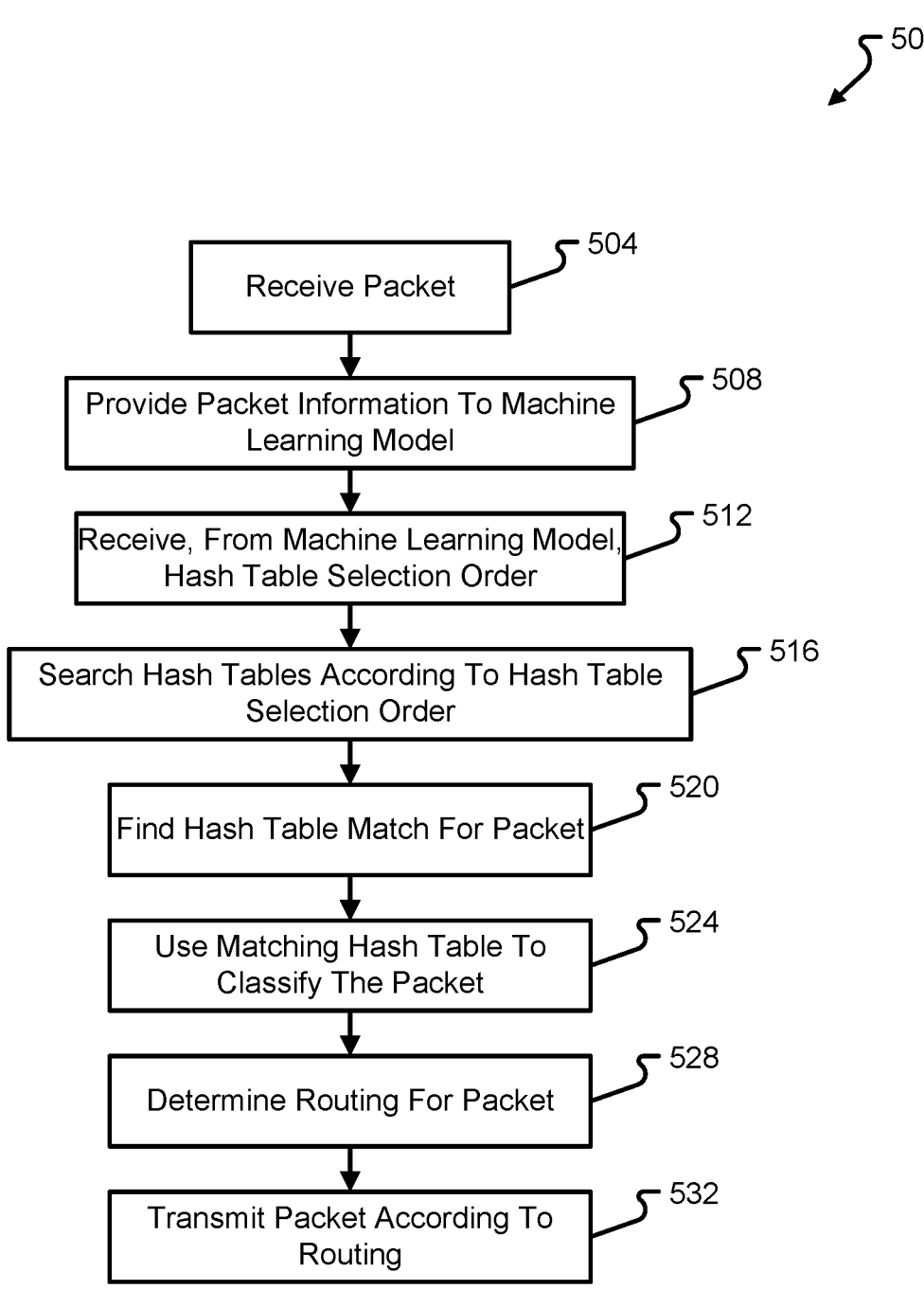
FIG. 5 is a flow diagram illustrating a second packet processing method in accordance with at least some embodiments of the present disclosure.
Figure 6:
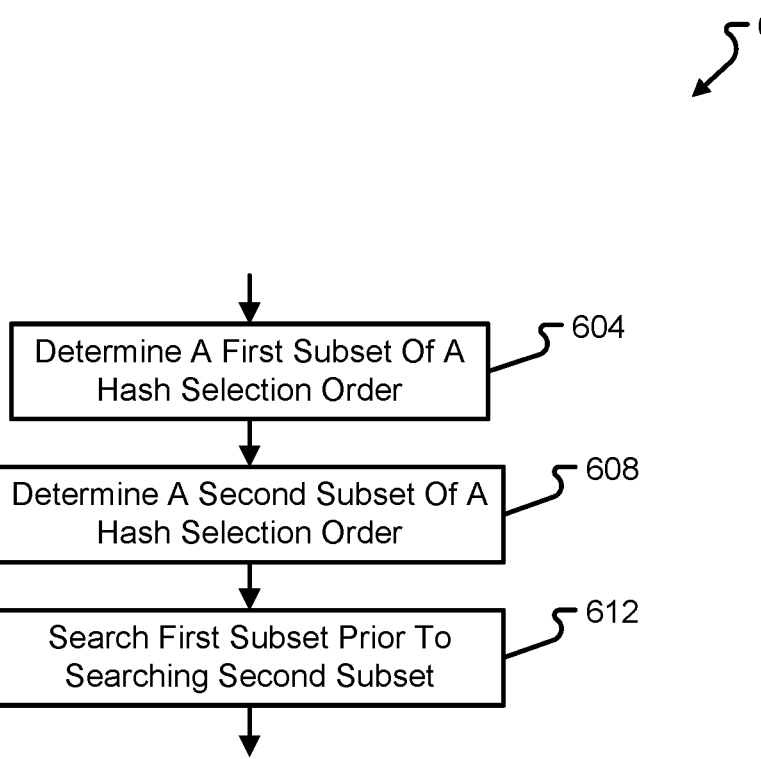
FIG. 6 is a flow diagram illustrating a third packet processing method in accordance with at least some embodiments of the present disclosure.

With reference now to FIGS. 4-6, various possible methods of processing a packet 120 will be described in accordance with at least some embodiments. It should be appreciated that any of the components depicted and/or described herein may be configured to perform some or all of the method steps. It should also be appreciated that any step from any of the methods may be included in any other method without departing from the scope of the present disclosure. Said another way, the order of steps depicted and described herein should not be construed as limiting the scope of the claims to that particular order.

Referring initially to FIG. 4, a first packet processing method 400 will be described in accordance with at least some embodiments of the present disclosure. The method 400 begins when a packet 120 is received at the network device 104 (step 404). The packet 120 may then, optionally, be stored in the buffer 152.

The method 400 then continues with the processor 132 invoking the hash selection circuit(s) 148 to analyze information 124 from the packet 120 to determine a hash table selection order (step 408). As discussed above, the hash selection circuit(s) 148 may include a machine learning classifier 304 and one or more filters 308. The machine learning classifier 304 may determine part of the hash table selection order while the one or more filters 308 may determine the other part of the hash table selection order. The combination of the machine learning classifier 304 and filters 308 may produce a complete hash table selection order.

The hash table selection order may be provided to the packet classification circuit(s) 144. Upon receiving the hash table selection order, the packet classification circuit(s) 144 may select, based on the hash table selection order, a hash table 140 for use in classifying the packet 120 (step 412). The hash tables 140 may be searched and the selection of a particular hash table 140 may be made with reference to the hash table selection order. In embodiments where the hash selection circuit(s) 148 can provide a hash table selection order that minimizes the number of hash tables 140 that need to be searched by the packet classification circuit(s) 144, the time needed to select a hash table 140 can be reduced. Reducing the time needed to select a hash table 140 can improve the overall performance of the network device 104 when processing the packet 120.

The method 400 continues with the packet classification circuit(s) 144 using the selected hash table 140 to classify the packet 120 (step 416). Based on the classification of the packet 120, packet routing decision(s) are made for the packet 120 (step 420). The packet 120 may then be transmitted to the data target(s) 112 according to the routing decisions (step 424).

Referring now to FIG. 5, a second packet processing method 500 will be described in accordance with at least some embodiments of the present disclosure. The method 500 begins when a packet 120 is received at the network device 104 (step 504). This step may be similar or identical to step 404.

The method 500 continues by providing packet information 124 to the architecture 300 used to generate a hash table selection order. In some embodiments, the packet information 124 is provided to one or more filters 308 and to a machine learning model (step 508). The machine learning model that processes the packet information 124 may correspond to the machine learning classifier 304. The machine learning model, along with the filters 308, may generate a hash table selection order that is provided as an output to the packet classification circuit(s) 144 (step 512). The packet classification circuit(s) 144 may then search the hash table(s) 140 according to the hash table selection order (step 516).

The packet classification circuit(s) 144 will continue searching the hash table(s) 140 until a hash table is found that matches with the information 124 from the packet 120 (step 520). The matching hash table 140 is then used to classify the packet 120 (step 524). The classification of the packet 120 may then be used to determine routing parameters for the packet 120 (step 528). For example, a next hop or a network path may be selected for the packet 120 as part of determining how to route the packet 120. The packet 120 may then be transmitted according to the routing (step 532).

With reference now to FIG. 6, a third packet processing method 600 will be described in accordance with at least some embodiments of the present disclosure. The method 600 may be used to supplement or replace any steps described in connection with other methods 400, 500. For instance, the steps of method 600 may be used as part of performing step 408.

The method 600 includes determining a first subset of a hash selection order (step 604). The method 600 also includes determining a second subset of the hash selection order (step 608). Steps 604 and 608 may be performed serially or in parallel. In some embodiments, the architecture 300 is used to perform steps 604 and 608 in parallel with one another. The filter(s) 308 may be used to determine the first subset of the hash selection order while the machine learning classifier 304 may be used to determine the second subset of the hash selection order.

The first subset and the second subset may be combined into a complete hash selection order. The complete hash selection order may then be used to search the hash table(s) 140. In some embodiments, the first subset of the hash selection order is searched before the second subset (step 612). As an example, the subset of the hash selection order determined by the filter(s) 307 may be searched before the subset of the hash selection order determined by the machine learning classifier 304.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A network device comprising:
one or more packet classification circuits; and
one or more hash selection circuits that cooperate with the one or more packet classification circuits to provide the one or more packet classification circuits with a hash table selection order that is determined for a packet and that enables the one or more packet classification circuits to intelligently search one hash table before another hash table in a plurality of hash tables according to the hash table selection order based on information contained in the packet, wherein the plurality of hash tables include a first hash table and a second hash table, and wherein when a match is found between the packet and the first hash table, the one or more packet classification circuits utilize the first hash table to classify the packet without further attempting to match the packet to the second hash table.

2. The network device of claim 1, wherein the one or more hash selection circuits enable the hash table selection order to be dynamically determined for the packet and wherein the one or more packet classification circuits enable packet forwarding from a first network location to a second network location using a selected hash table.

3. The network device of claim 1, wherein the hash table selection order provides the one or more packet classification circuits with an order in which a plurality of hash tables are searched and matched against the packet.

4. The network device of claim 3, wherein the first hash table is positioned higher in the hash table selection order than the second hash table when the first hash table comprises more matching classifier parameters for the packet as compared to the second hash table.

5. The network device of claim 1, wherein the one or more packet classification circuits and the one or more hash selection circuits are provided in a common processing unit.

6. The network device of claim 1, wherein the one or more packet classification circuits are provided in a first processing unit and wherein the one or more hash selection circuits are provided in a second processing unit.

7. The network device of claim 1, wherein the hash table selection order is provided by a machine learning model.

8. The network device of claim 7, wherein the machine learning model processes the information contained in the packet to determine the hash table selection order.

9. The network device of claim 8, wherein the machine learning model is provided as part of the one or more hash selection circuits.

10. The network device of claim 8, wherein the machine learning model is provided separate from the one or more hash selection circuits.

11. The network device of claim 8, further comprising an approximate membership check filter that is to determine a first subset of the hash table selection order and wherein the machine learning model is to determine a second subset of the hash table selection order.

12. The network device of claim 8, wherein the machine learning model comprises at least one of a random forest, a logistic regression, and a decision tree.

13. A system, comprising:

one or more processors; and computer memory coupled with the one or more processors, wherein the computer memory comprises data stored thereon that, when executed by the one or more processors, enables the one or more processors to:

receive a packet;

determine a hash table selection order for the packet based on information contained in the packet;

search one hash table before another hash table according to the hash table selection order;

select, based on executing the search of hash tables according to the hash table selection order, a first hash table from among a plurality of hash tables for use in classification of the packet, wherein the plurality of hash tables include the first hash table and a second hash table; and classify the packet using the selected first hash table when a match is found between the packet and the first hash table without further attempting to match the packet to the second hash table.

14. The system of claim 13, wherein the one or more processors comprise a first processor and a second processor.

15. The system of claim 13, wherein the searching of the plurality of hash tables according to the hash table selection order is stopped when the packet is found to match the selected hash table, and wherein the hash table selection order is determined based on an output from a machine learning model that is trained to correlate hash tables with packets based on network flow data.

16. The system of claim 15, wherein the machine learning model comprises at least one of a random forest, a logistic regression, and a decision tree.

17. The system of claim 15, further comprising a filter that is applied to determine a first subset of the hash table selection order and wherein the machine learning model determines a second subset of the hash table selection order.

18. The system of claim 13, wherein the one or more processors and the computer memory are provided in a common processing unit.

19. A network device, comprising:

a processor; and computer memory coupled with the processor, wherein the computer memory comprises data stored thereon that, when executed by the processor, enables the processor to:

receive a packet;

provide information from the packet to a machine learning model;

receive, from the machine learning model, a hash table selection order that is determined based on the information from the packet;

search, according to the hash table selection order, one or more hash tables for a match with the packet, wherein the one or more hash tables comprise a first hash table and a second hash table that are searchable for the match with the packet one at a time according to the hash table selection order which defines a most likely hash table in the one or more hash table be searched before other hash tables in the one or more hash tables;

determine, based on searching, that the first hash table from the one or more hash tables matches the packet; and utilize the first hash table to classify the packet within a network when the match is found between the packet and the first hash table without further attempting to match the packet to the second hash table.

20. The network device of claim 19, further comprising:

an approximate membership check filter that is applicable to determine a first subset of the hash table selection order, wherein the machine learning model determines a second subset of the hash table selection order, and wherein the machine learning model comprises at least one of a random forest, a logistic regression, and a decision tree.

\* \* \* \* \*